US012361783B2

(12) United States Patent
Schwartz

(10) Patent No.: US 12,361,783 B2
(45) Date of Patent: Jul. 15, 2025

(54) GAMING MACHINE AND METHOD FOR EVALUATING PLAYER REACTIONS

(71) Applicant: Aristocrat Technologies Australia Pty Limited, North Ryde (AU)

(72) Inventor: Gregory Paul Schwartz, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 18/461,233

(22) Filed: Sep. 5, 2023

(65) Prior Publication Data

US 2023/0419778 A1 Dec. 28, 2023

Related U.S. Application Data

(63) Continuation of application No. 17/697,637, filed on Mar. 17, 2022, now Pat. No. 11,783,669, which is a continuation of application No. 16/778,743, filed on Jan. 31, 2020, now Pat. No. 11,288,920, which is a continuation of application No. 16/109,298, filed on Aug. 22, 2018, now Pat. No. 10,593,152, said (Continued)

(51) Int. Cl.
*G07F 17/32* (2006.01)

(52) U.S. Cl.
CPC ...... *G07F 17/3239* (2013.01); *G07F 17/3206* (2013.01)

(58) Field of Classification Search
CPC ......................... G07F 17/3239; G07F 17/3206
See application file for complete search history.

(56) References Cited

U.S. PATENT DOCUMENTS 39,370 A 8/1863 Alexander
4,582,324 A 4/1986 Koza (Continued)

FOREIGN PATENT DOCUMENTS

AU 2019203135 A1 12/2019
GB 2573622 4/2019

(Continued)

OTHER PUBLICATIONS

Office Action (Non-Final Rejection) dated Mar. 7, 2024 for U.S. Appl. No. 18/351,965 (pp. 1-38).

(Continued)

*Primary Examiner* — Ronald Laneau
(74) *Attorney, Agent, or Firm* — Armstrong Teasdale LLP

(57) ABSTRACT

An electronic gaming machine includes a display, a digital camera device, a credit input mechanism, and a processor programmed to perform operations comprising: (i) receiving, from the digital camera device, a digital image of the player; (ii) determining an emotional state of the player by performing facial expression analysis on the digital image; (iii) determining an emotion level of the player by categorizing the emotional state of the player based on the determined emotional state, the categorizing includes a first state representing a positive emotional level and a second state representing another emotional level; (iv) determining that the emotional level is the other emotional level; and (v) automatically initiating a game session action during the game play session, the game session action is configured to cause the player to transition to the positive emotional level.

20 Claims, 6 Drawing Sheets

Related U.S. Application Data application No. 17/697,637 is a continuation of application No. 16/778,768, filed on Jan. 31, 2020, now Pat. No. 11,302,142, which is a continuation of application No. 16/109,298, said application No. 17/697,637 is a continuation of application No. 16/778,841, filed on Jan. 31, 2020, now Pat. No. 11,308,758, which is a continuation of application No. 16/109,298, said application No. 17/697,637 is a continuation of application No. 16/778,889, filed on Jan. 31, 2020, now Pat. No. 11,335,161, which is a continuation of application No. 16/109,298, said application No. 17/697,637 is a continuation of application No. 16/778,987, filed on Jan. 31, 2020, now Pat. No. 11,335,162, which is a continuation of application No. 16/109,298, said application No. 17/697,637 is a continuation of application No. 16/778,923, filed on Jan. 31, 2020, now Pat. No. 11,328,554, which is a continuation of application No. 16/109,298.

(56) References Cited

U.S. PATENT DOCUMENTS

| | | | |
|---|---|---|---|
| 5,283,422 | A | 2/1994 | Storch |
| 5,326,104 | A | 7/1994 | Pease |
| 5,605,334 | A | 2/1997 | McCrea, Jr. |
| 5,643,086 | A | 7/1997 | Alcorn |
| 5,735,742 | A | 4/1998 | French |
| 5,970,143 | A | 10/1999 | Schneier |
| 6,154,131 | A | 11/2000 | Jones, II |
| 6,165,069 | A | 12/2000 | Sines |
| 6,383,076 | B1 | 5/2002 | Tiedeken |
| 6,460,848 | B1 | 10/2002 | Soltys |
| 6,488,585 | B1 | 12/2002 | Wells |
| 6,641,484 | B2 | 11/2003 | Oles |
| 7,003,139 | B2 | 2/2006 | Endrikhovski |
| 7,154,380 | B1 | 12/2006 | Tarrab, Jr. |
| 7,168,089 | B2 | 1/2007 | Nguyen |
| 7,316,615 | B2 | 1/2008 | Soltys |
| 7,581,256 | B2 | 8/2009 | Cockerille |
| 7,708,638 | B2 | 5/2010 | Enzminger |
| 7,736,234 | B2 | 6/2010 | Cockerille |
| 7,815,507 | B2 | 10/2010 | Parrott |
| 7,951,003 | B2 | 5/2011 | Russell |
| 8,157,647 | B2 | 4/2012 | House |
| 8,303,417 | B2 | 11/2012 | Burke |
| 8,366,542 | B2 | 2/2013 | White |
| 8,407,147 | B2 | 3/2013 | Lenger |
| 8,449,378 | B2 | 5/2013 | Michaelson |
| 8,608,568 | B2 | 12/2013 | Carpenter |
| 8,628,413 | B2 | 1/2014 | Lemay |
| 8,657,674 | B2 | 2/2014 | Lemay |
| 8,777,758 | B2 | 7/2014 | Anderson |
| 8,801,517 | B2 | 8/2014 | Walker |
| 8,917,971 | B2 | 12/2014 | Woods |
| 8,944,910 | B1 | 2/2015 | Boyle |
| 8,974,304 | B2 | 3/2015 | Gagner |
| 9,033,791 | B2 | 5/2015 | Hamlin |
| 9,084,937 | B2 | 7/2015 | Gadher |
| 9,117,329 | B2 | 8/2015 | Osgood |
| 9,117,339 | B2 | 8/2015 | Burke |
| 9,269,216 | B2 | 2/2016 | Keilwert |
| 9,325,203 | B2 | 4/2016 | Nguyen |
| 9,367,991 | B2 | 6/2016 | Acres |
| 9,616,324 | B2 | 4/2017 | Krenn |
| 9,865,139 | B2 | 1/2018 | Walker |
| 10,037,648 | B2 | 7/2018 | Acres |
| 10,223,679 | B2 | 3/2019 | Lee |
| 10,229,561 | B2 | 3/2019 | Cage |
| 10,275,583 | B2 | 4/2019 | Leuthardt |
| 10,297,106 | B1 | 5/2019 | Simons |
| 10,322,727 | B1 | 6/2019 | Chan |
| 10,425,426 | B1 | 9/2019 | Simons |
| 10,497,204 | B2 | 12/2019 | Weber |
| 10,530,569 | B2 | 1/2020 | Bisti |
| 10,549,202 | B2 | 2/2020 | McCoy |
| 10,706,678 | B2 | 7/2020 | Nguyen |
| 10,741,017 | B2 | 8/2020 | Silva |
| 10,824,759 | B1 | 11/2020 | Magerkurth |
| 10,850,204 | B2 | 12/2020 | Bruzzo |
| 10,943,438 | B2 | 3/2021 | Cage |
| 10,949,417 | B2 | 3/2021 | Kurian |
| 10,950,081 | B2 | 3/2021 | Baker |
| 10,991,201 | B2 | 4/2021 | McDowell |
| 11,004,304 | B2 | 5/2021 | Nguyen |
| 11,023,981 | B2 | 6/2021 | Hu |
| 11,045,726 | B2 | 6/2021 | Hennessy |
| 11,107,321 | B2 | 8/2021 | Ovalle |
| 11,158,170 | B2 | 10/2021 | Thomas |
| 11,159,334 | B2 | 10/2021 | Kuzma |
| 11,159,945 | B2 | 10/2021 | Obaidi |
| 11,189,130 | B2 | 11/2021 | Purohit |
| 11,195,371 | B2 | 12/2021 | Purohit |
| 11,232,442 | B2 | 1/2022 | Liu |
| 11,245,529 | B2 | 2/2022 | Clark |
| 11,288,921 | B2 | 3/2022 | Haishima |
| 11,308,761 | B2 | 4/2022 | Purohit |
| 11,373,446 | B1 | 6/2022 | Beisel |
| 11,373,480 | B2 | 6/2022 | Taylor |
| 11,380,070 | B2 | 7/2022 | Koidahl |
| 11,688,233 | B2 | 6/2023 | Acres |
| 11,783,669 | B2 | 10/2023 | Schwartz |
| 2001/0019966 | A1 | 9/2001 | Idaka |
| 2002/0025850 | A1 | 2/2002 | Hafezi |
| 2002/0032051 | A1 | 3/2002 | Stockdale |
| 2002/0138461 | A1 | 9/2002 | Sinclair |
| 2002/0142831 | A1 | 10/2002 | Mattice |
| 2002/0152120 | A1 | 10/2002 | Howington |
| 2003/0032485 | A1 | 2/2003 | Cockerille |
| 2003/0060283 | A1 | 3/2003 | Rowe |
| 2004/0048669 | A1 | 3/2004 | Rowe |
| 2004/0127277 | A1 | 7/2004 | Walker |
| 2004/0235562 | A1 | 11/2004 | Kiely |
| 2005/0043086 | A1 | 2/2005 | Schneider |
| 2005/0054430 | A1 | 3/2005 | Pitman |
| 2005/0130728 | A1 | 6/2005 | Nguyen |
| 2006/0035713 | A1 | 2/2006 | Cockerille |
| 2006/0063595 | A1 | 3/2006 | Kondo |
| 2006/0100009 | A1 | 5/2006 | Walker |
| 2006/0111172 | A1 | 5/2006 | Walker |
| 2006/0166732 | A1 | 7/2006 | Lechner |
| 2006/0189382 | A1 | 8/2006 | Muir |
| 2006/0205488 | A1 | 9/2006 | Gagner |
| 2006/0264253 | A1 | 11/2006 | Trobia |
| 2007/0054734 | A1 | 3/2007 | Morrow |
| 2008/0058059 | A1 | 3/2008 | Fitzsimons |
| 2008/0167118 | A1 | 7/2008 | Kroeckel |
| 2008/0182667 | A1 | 7/2008 | Davis |
| 2008/0214300 | A1 | 9/2008 | Williams |
| 2008/0235746 | A1 | 9/2008 | Peters |
| 2009/0042640 | A1 | 2/2009 | Gagner |
| 2009/0061987 | A1 | 3/2009 | Canterbury |
| 2009/0124392 | A1 | 5/2009 | Ruppert |
| 2009/0181720 | A1 | 7/2009 | Marsico |
| 2009/0197660 | A1 | 8/2009 | Cramer |
| 2009/0247293 | A1 | 10/2009 | Lenger |
| 2010/0093428 | A1 | 4/2010 | Mattice |
| 2010/0203961 | A1 | 8/2010 | Burke |
| 2010/0234094 | A1 | 9/2010 | Gagner |
| 2010/0248812 | A1 | 9/2010 | Pacey |
| 2010/0255902 | A1 | 10/2010 | Goldstein |
| 2010/0291994 | A1 | 11/2010 | Denham |
| 2011/0089730 | A1 | 4/2011 | Higgs |
| 2011/0102546 | A1 | 5/2011 | Dhuse |
| 2011/0109134 | A1 | 5/2011 | Filipour |
| 2011/0111838 | A1 | 5/2011 | Bauer |
| 2011/0117984 | A1 | 5/2011 | Shimabukuro |
| 2011/0124405 | A1 | 5/2011 | Okada |
| 2011/0195789 | A1 | 8/2011 | Wells |
| 2012/0021824 | A1 | 1/2012 | Wells |
| 2012/0028703 | A1 | 2/2012 | Anderson |
| 2012/0035751 | A1 | 2/2012 | Dimitriadis |

(56) References Cited

U.S. PATENT DOCUMENTS

2012/0100908 A1 4/2012 Wells
2012/0129596 A1 5/2012 Thackston
2012/0193956 A1 8/2012 Baker
2012/0229508 A1 9/2012 Wigdor
2012/0322564 A1 12/2012 Granger
2013/0072304 A1 3/2013 Brosnan
2013/0084959 A1 4/2013 Nelson
2013/0084960 A1 4/2013 Frady
2013/0084973 A1 4/2013 Frady
2013/0085001 A1 4/2013 Anderson
2013/0137498 A1 5/2013 Willyard
2013/0190095 A1 7/2013 Gadher
2013/0196755 A1 8/2013 Nelson
2014/0219492 A1 8/2014 Pelliccio
2014/0235324 A1 8/2014 Ryan
2014/0256450 A1 9/2014 Bleich
2014/0274309 A1 9/2014 Nguyen
2014/0309012 A1 10/2014 Anderson
2014/0323194 A1 10/2014 Keilwert
2014/0324749 A1* 10/2014 Peters ...................... G09B 7/04
706/46
2015/0279155 A1 10/2015 Chun
2015/0302690 A1 10/2015 Hutchinson-Kay
2016/0012465 A1 1/2016 Sharp
2016/0023116 A1 1/2016 Wire
2016/0292558 A1 10/2016 Vienneau
2016/0335840 A1 11/2016 Acres
2017/0061731 A1 3/2017 Colvin
2017/0161991 A1 6/2017 Ayati
2017/0278304 A1 9/2017 Hildreth
2017/0287593 A1 10/2017 Ovalle
2017/0293669 A1 10/2017 Madhavan
2017/0300876 A1 10/2017 Musiala, Jr.
2017/0316644 A1 11/2017 Arnone
2018/0019867 A1 1/2018 Davis
2018/0089956 A1 3/2018 Nagaragatta
2018/0096175 A1 4/2018 Schmeling
2018/0096752 A1 4/2018 Ovalle
2018/0114403 A1 4/2018 Jayachandran
2018/0370476 A1 12/2018 Alequin
2019/0028264 A1 1/2019 Bisti
2019/0028265 A1 1/2019 Bisti
2019/0066488 A1 2/2019 Locke
2019/0080554 A1 3/2019 Barbour
2019/0096170 A1 3/2019 Lewis
2019/0096191 A1 3/2019 Stuehling
2019/0102986 A1 4/2019 Nelson
2019/0109714 A1 4/2019 Clark
2019/0122300 A1 4/2019 O'Brien
2019/0122492 A1 4/2019 Nguyen
2019/0122495 A1 4/2019 Yi
2019/0130698 A1 5/2019 Simons
2019/0130701 A1 5/2019 Simons
2019/0143207 A1 5/2019 Kumar
2019/0163672 A1 5/2019 Shmueli
2019/0180558 A1 6/2019 Merati
2019/0188653 A1 6/2019 Khaund
2019/0205894 A1 7/2019 Gonzales, Jr.
2019/0221076 A1 7/2019 Simons
2019/0280875 A1 9/2019 Ragnoni
2019/0289019 A1 9/2019 Thekadath
2019/0295371 A1 9/2019 Simons
2019/0296915 A1 9/2019 Lancashire
2019/0314726 A1 10/2019 Masini
2019/0321722 A1 10/2019 Hennessy
2019/0325700 A1 10/2019 Jayachandran
2019/0333285 A1 10/2019 Delia
2019/0352125 A1 11/2019 Wooten
2019/0355209 A1 11/2019 Sorey
2019/0373015 A1 12/2019 Kozloski
2020/0020194 A1 1/2020 Higgins
2020/0021600 A1 1/2020 Simons
2020/0027315 A1 1/2020 Cotton
2020/0051368 A1 2/2020 Pustizzi
2020/0066093 A1 2/2020 Schwartz
2020/0090463 A1 3/2020 Mohrhardt
2020/0097862 A1 3/2020 Arora
2020/0105096 A1 4/2020 Ovalle
2020/0110855 A1 4/2020 Cunningham
2020/0145217 A1 5/2020 Clark
2020/0152005 A1 5/2020 Higgins
2020/0168036 A1 5/2020 Schwartz
2020/0168038 A1 5/2020 Schwartz
2020/0189420 A1 6/2020 Urano
2020/0193764 A1 6/2020 Ovalle
2020/0211325 A1 7/2020 Kaizerman
2020/0380817 A1 12/2020 Purohit
2020/0410433 A1 12/2020 Rahilly
2020/0412813 A1 12/2020 Mong
2021/0037013 A1 2/2021 Salkintzis
2021/0174634 A1 6/2021 Purohit
2021/0233351 A1 7/2021 Meltzer
2021/0241566 A1 8/2021 Russ
2021/0255995 A1 8/2021 Shmueli
2021/0327208 A1 10/2021 Colvin
2021/0335085 A1 10/2021 Froy, Jr.
2021/0350659 A1 11/2021 Purohit
2022/0006831 A1 1/2022 Garg
2022/0030000 A1 1/2022 Lee
2022/0207959 A1* 6/2022 Schwartz ............ G07F 17/3239
2022/0215719 A1* 7/2022 Schwartz ............ G07F 17/3239
2022/0383695 A1 12/2022 Demarco
2022/0392312 A1 12/2022 Marks
2023/0130583 A1 4/2023 Shaffer, Jr.
2023/0306816 A1 9/2023 Nimish
2023/0419778 A1* 12/2023 Schwartz ............ G07F 17/3239

FOREIGN PATENT DOCUMENTS

WO 2019089774 A1 5/2019
WO 2019089778 A1 5/2019

OTHER PUBLICATIONS

Office Action (Non-Final Rejection) dated Mar. 7, 2024 for U.S. Appl. No. 18/351,962 (pp. 1-38).
Office Action dated Mar. 19, 2024 for U.S. Appl. No. 18/191,693 (pp. 1-17).
Notice of Allowance dated Mar. 22, 2024 for U.S. Appl. No. 17/858,769 (pp. 1-9).
Notice of Allowance dated Apr. 16, 2024 for U.S. Appl. No. 17/844,466 (pp. 1-5).
Office Action (Notice of Allowance and Fees Due (PTOL-85)) dated Apr. 16, 2024 for U.S. Appl. No. 17/844,466 (pp. 1-5).
Office Action (Non-Final Rejection) dated Dec. 6, 2023 for U.S. Appl. No. 17/844,466 (pp. 1-7).
Office Action (Notice of Allowance and Fees Due (PTOL-85)) dated Feb. 22, 2024 for U.S. Appl. No. 17/705,010 (pp. 1-9).
Brendan Koemer, "Russians Engineer A Brilliant Slot Machine Cheat—And Casinos Have No Fix", https://www.wired.com/2017/02/russians-engineer-brilliant-slot-machine-cheat-casinos-no-fix/, Nov. 6, 2018, 14 pages.
Brendan Koemer, "Meet Alex, The Russian Casino Hacker Who Makes Millions Targeting Slot Machines", https://Wired.com/story/meet-alex-the-russian-casino-hacker-who-makes-millions-targeting-slot-machines/, Nov. 6, 2018, 18 pages.
Office Action dated Mar. 8, 2021 for U.S. Appl. No. 16/415,654 (pp. 1-12).
Office Action (Notice of Allowance and Fees Due (PTOL-85)) dated Nov. 26, 2021 for U.S. Appl. No. 16/778,743 (pp. 1-9).
Office Action (Notice of Allowance and Fees Due (PTOL-85)) dated Aug. 25, 2021 for U.S. Appl. No. 16/415,654 (pp. 1-10).
Office Action (Notice of Allowance and Fees Due (PTOL-85)) dated Oct. 6, 2021 for U.S. Appl. No. 16/864,800 (pp. 1-9).
Office Action (Notice of Allowance and Fees Due (PTOL-85)) dated Dec. 8, 2021 for U.S. Appl. No. 16/778,768 (pp. 1-8).
Office Action (Notice of Allowance and Fees Due (PTOL-85)) dated Dec. 21, 2021 for U.S. Appl. No. 16/837,655 (pp. 1-8).
Office Action (Notice of Allowance and Fees Due (PTOL-85)) dated Dec. 23, 2021 for U.S. Appl. No. 16/778,841 (pp. 1-9).

(56) References Cited

OTHER PUBLICATIONS

Office Action (Notice of Allowance and Fees Due (PTOL-85)) dated Feb. 8, 2022 for U.S. Appl. No. 16/778,987 (pp. 1-8).
Office Action (Notice of Allowance and Fees Due (PTOL-85)) dated Jan. 13, 2022 for U.S. Appl. No. 16/864,800 (pp. 1-7).
Office Action (Notice of Allowance and Fees Due (PTOL-85)) dated Jan. 14, 2022 for U.S. Appl. No. 16/778,923 (pp. 1-8).
Office Action (Notice of Allowance and Fees Due (PTOL-85)) dated Aug. 11, 2021 for U.S. Appl. No. 16/902,186 (pp. 1-8).
Office Action (Notice of Allowance and Fees Due (PTOL-85)) dated Feb. 2, 2022 for U.S. Appl. No. 16/778,889 (pp. 1-8).
Office Action (Non-Final Rejection) dated Feb. 1, 2022 for U.S. Appl. No. 17/222,763 (pp. 1-9).
Office Action (Notice of Allowance and Fees Due (PTOL-85)) dated Mar. 9, 2022 for U.S. Appl. No. 16/841,957 (pp. 1-9).
Australian Examination Report No. 1 issued in App. No. AU2019219795, dated Oct. 16, 2023, 4 pages.
Office Action (Final Rejection) dated May 13, 2022 for U.S. Appl. No. 17/222,763 (pp. 1-11).
Office Action (Non-Final Rejection) dated Aug. 30, 2022 for U.S. Appl. No. 17/222,763 (pp. 1-11).
Office Action (Notice of Allowance and Fees Due (PTOL-85)) dated Jan. 5, 2023 for U.S. Appl. No. 17/222,763 (pp. 1-7).
Office Action (Non-Final Rejection) dated Jan. 18, 2023 for U.S. Appl. No. 17/671,388 (pp. 1-6).
Office Action (Notice of Allowance and Fees Due (PTOL-85)) dated Feb. 10, 2023 for U.S. Appl. No. 17/721,152 (pp. 1-10).
Office Action (Non-Final Rejection) dated Mar. 16, 2023 for U.S. Appl. No. 17/529,050 (pp. 1-13).
Office Action (Non-Final Rejection) dated Mar. 16, 2023 for U.S. Appl. No. 17/529,069 (pp. 1-13).
Office Action (Non-Final Rejection) dated Apr. 12, 2023 for U.S. Appl. No. 17/543,339 (pp. 1-5).
Office Action (Notice of Allowance and Fees Due (PTOL-85)) dated Apr. 14, 2023 for U.S. Appl. No. 17/529,069 (pp. 1-9).
Notice of Allowance dated Apr. 14, 2023 for U.S. Appl. No. 17/529,050 (pp. 1-9).
Office Action (Notice of Allowance and Fees Due (PTOL-85)) dated Apr. 26, 2023 for U.S. Appl. No. 17/671,388 (pp. 1-9).
Office Action (Notice of Allowance and Fees Due (PTOL-85)) dated May 10, 2023 for U.S. Appl. No. 17/543,339 (pp. 1-5).
Office Action (Notice of Allowance and Fees Due (PTOL-85)) dated Jun. 7, 2023 for U.S. Appl. No. 17/697,637 (pp. 1-9).
Office Action (Final Rejection) dated Sep. 23, 2024 for U.S. Appl. No. 18/191,693 (pp. 1-10).
Office Action (Notice of Allowance and Fees Due (PTOL-85)) dated Nov. 8, 2024 for U.S. Appl. No. 17/709,146 (pp. 1-8).
Office Action (Notice of Allowance and Fees Due (PTOL-85)) dated Nov. 27, 2024 for U.S. Appl. No. 18/302,542 (pp. 1-5).
Office Action (Final Rejection) dated Nov. 25, 2024 for U.S. Appl. No. 17/857,988 (pp. 1-22).
Office Action (Notice of Allowance and Fees Due (PTOL-85)) dated Dec. 13, 2024 for U.S. Appl. No. 18/364,231 (pp. 1-5).
Australian Examination Report No. 1 issued in App. No. AU2023201845, daated Jun. 12, 2024, 4 pages.
Office Action (Non-Final Rejection) dated Jun. 18, 2024 for U.S. Appl. No. 17/857,988 (pp. 1-18).
Office Action (Notice of Allowance and Fees Due (PTOL-85)) dated Jul. 9, 2024 for U.S. Appl. No. 17/858,769 (pp. 1-8).
Office Action (Notice of Allowance and Fees Due (PTOL-85)) dated Jul. 16, 2024 for U.S. Appl. No. 18/351,965 (pp. 1-8).
Office Action (Notice of Allowance and Fees Due (PTOL-85)) dated Jul. 16, 2024 for U.S. Appl. No. 18/351,962 (pp. 1-8).
Office Action (Non-Final Rejection) dated Jul. 29, 2024 for U.S. Appl. No. 17/709,146 (pp. 1-7).
Office Action (Notice of Allowance and Fees Due (PTOL-85)) dated Aug. 14, 2024 for U.S. Appl. No. 17/858,769 (pp. 1-2).
Office Action (Non-Final Rejection) dated Aug. 19, 2024 for U.S. Appl. No. 18/364,231 (pp. 1-6).
Office Action (Non-Final Rejection) dated Aug. 20, 2024 for U.S. Appl. No. 17/858,009 (pp. 1-9).

* cited by examiner

GAMING MACHINE AND METHOD FOR EVALUATING PLAYER REACTIONS

CROSS-REFERENCE TO RELATED APPLICATIONS

This application is a continuation application of and claims the benefit of priority to U.S. patent application Ser. No. 17/697,637, filed Mar. 17, 2022, entitled "GAMING MACHINE AND METHOD FOR EVALUATING PLAYER REACTIONS", which is a continuation application and claims the benefit of priority to: U.S. patent application Ser. No. 16/778,743, filed Jan. 31, 2020, entitled "GAMING MACHINE AND METHOD FOR EVALUATING PLAYER REACTIONS"; U.S. patent application No. U.S. patent application Ser. No. 16/778,768, filed Jan. 31, 2020, entitled "GAMING MACHINE AND METHOD FOR EVALUATING PLAYER REACTIONS"; U.S. patent application Ser. No. 16/778,841, filed Jan. 31, 2020, entitled "GAMING MACHINE AND METHOD FOR EVALUATING PLAYER REACTIONS"; U.S. patent application Ser. No. 16/778,889, filed Jan. 31, 2020, entitled "GAMING MACHINE AND METHOD FOR EVALUATING PLAYER REACTIONS"; U.S. patent application Ser. No. 16/778,987, filed Jan. 31, 2020, entitled "GAMING MACHINE AND METHOD FOR EVALUATING PLAYER REACTIONS"; and U.S. patent application Ser. No. 16/778,923, filed Jan. 31, 2020, entitled "GAMING MACHINE AND METHOD FOR EVALUATING PLAYER REACTIONS," each of which are continuations of U.S. patent application Ser. No. 16/109,298, now U.S. Pat. No. 10,593,152, filed 22 Aug. 2018, entitled "GAMING MACHINE AND METHOD FOR EVALUATING PLAYER REACTIONS," the entire contents and disclosures of which are hereby incorporated herein by reference in their entirety.

TECHNICAL FIELD

The field of disclosure relates generally to electronic gaming, and more particularly to an electronic gaming machine and method that evaluate player reactions during game play.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

During game play, players may experience a variety of emotions and levels of engagement with their game. Players that enjoy and are highly engaged in a game tend to continue or repeat playing that game. Accordingly, providing engaging and entertaining games is desirable, both for the players as well as for casino operators and game developers.

BRIEF DESCRIPTION

In one embodiment, an electronic gaming machine is provided. An electronic gaming machine includes a display, a digital camera device configured to capture digital image data of a player of the electronic gaming machine during a game play session of a wagering game, a credit input mechanism including at least one of a card reader, a ticket reader, a bill acceptor, and a coin input mechanism, the credit input mechanism configured to receive a credit wager, a storage medium having instructions stored thereon, and a processor. The processor is coupled to the display, the credit input mechanism, and the storage medium. When executed, the instructions cause the processor to at least: (i) receive, from the digital camera device, a digital image of the player; (ii) determine an emotional state of the player by performing facial expression analysis on the digital image; (iii) determine an emotion level of the player by categorizing the emotional state of the player based on the determined emotional state, the categorizing includes a first state representing a positive emotional level and a second state representing another emotional level; (iv) determine that the emotional level is the other emotional level; and (v) automatically initiate a game session action during the game play session, the game session action is configured to cause the player to transition to the positive emotional level.

In another embodiment, a method of analyzing facial expressions of a player is provided. The method is implemented on an electronic gaming machine, the electronic gaming machine includes at least one processor in communication with at least one memory device, a digital camera device configured to capture digital image data of the player during a game play session of a wagering game, and with a display. The method includes: (i) receiving, from the digital camera device, a digital image of the player; (ii) determining an emotional state of the player by performing facial expression analysis on the digital image; (iii) determining an emotion level of the player by categorizing the emotional state of the player based on the determined emotional state, the categorizing includes a first state representing a positive emotional level and a second state representing another emotional level; (iv) determining that the emotional level is the other emotional level; and (v) automatically initiating a game session action during the game play session, the game session action is configured to cause the player to transition to the positive emotional level.

BRIEF DESCRIPTION OF THE DRAWINGS

An example embodiment of the subject matter disclosed will now be described with reference to the accompanying drawings.

DETAILED DESCRIPTION

Figure 1:
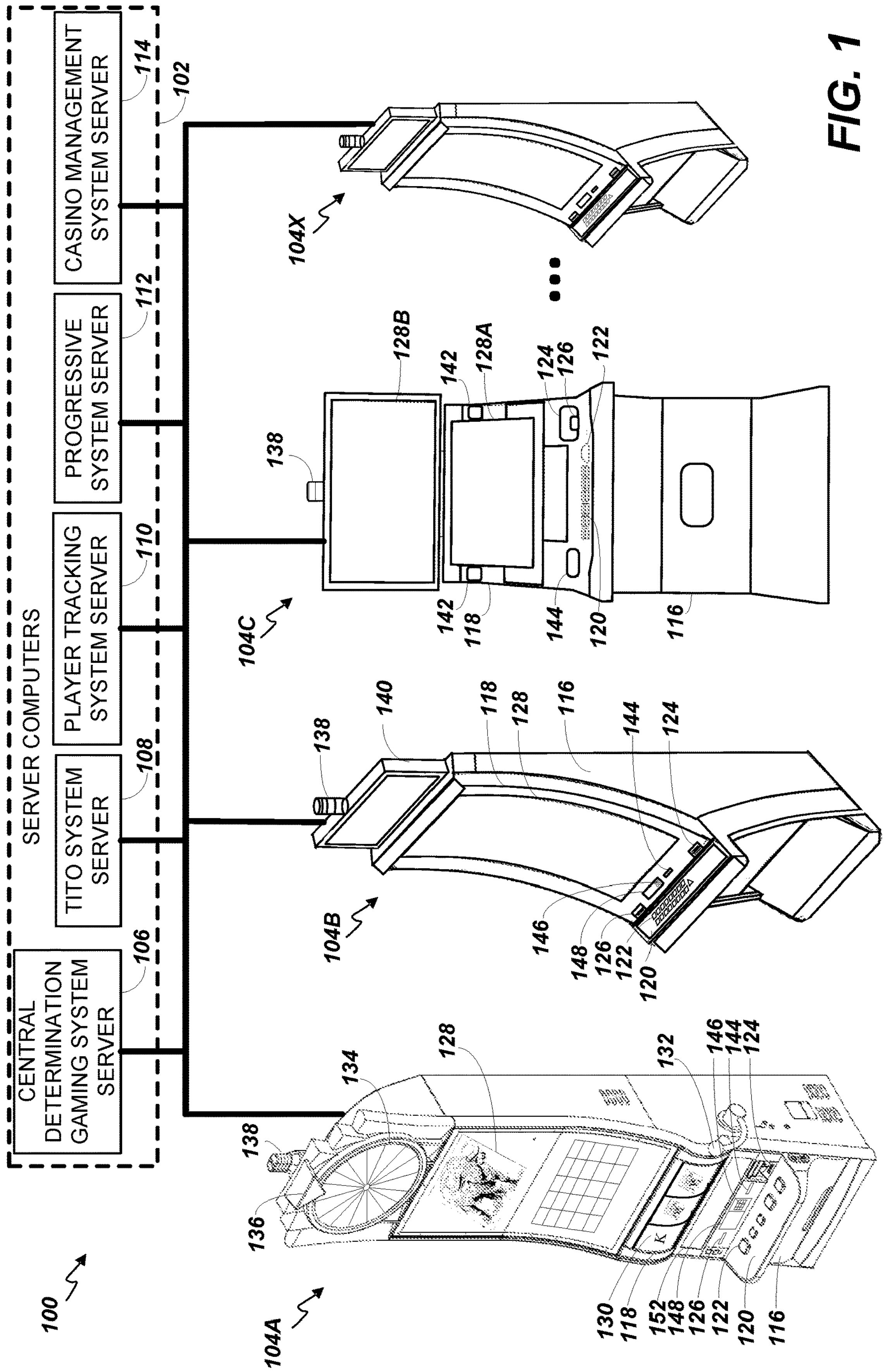
FIG. 1 is a diagram of exemplary EGMs networked with various gaming-related servers.

An electronic gaming machine (EGM) (or "gaming device") is described herein, in which player engagement and player emotion are captured during game play and used to enhance player experience. A player may experience a wide array of emotions during a game play session (e.g., from the time the player first sits down at the EGM and begins play, and until they stand up and leave the EGM). A particular game design or game features may provide differing levels of interest, entertainment, or engagement levels, each of which may be subjective to the player. Further, a gaming environment where the player plays the EGM, such as a casino, may present distractions or other environmental characteristics (e.g., based on where the EGM is positioned within the casino or on other occurrences happening near the EGM). Such distractions may have an impact on player engagement and enjoyment.

In an example embodiment, the EGM includes a digital camera device that operates in conjunction with an expression evaluation engine and a game controller to capture emotional states of the player during game play. More specifically, the digital camera device is integrated into the EGM and faces the player, capturing facial expressions of the player during game play. The expression evaluation engine receives digital video of the player and evaluates facial expressions made by the player to determine an emotional state of the player at various times. For example, the expression evaluation engine may determine that the player is joyful, angry, or sad. The game controller categorizes an emotion level of the player (e.g., positive, neutral, negative) based on the detected emotional state. Further, the game controller may also determine a level of engagement (e.g., high, low) of the player based on the emotional state (a level of arousal, e.g., calm, bored, alert, nervous).

The game controller may treat the positive emotion level as the most desirable emotion level of the player (e.g., where the player's excitement level and engagement with the game are high). Players may experience this level, for example, when there are exciting features of the game occurring, when the player has recently won a large payout, or when they relate to or are excited by the game design. The neutral level represents an emotion level in which the player is content, calm, or relaxed. Players may experience this level, for example, when they have recently experienced only modest wins, when there are no particularly interesting features of the game being activated, or when they are moderately disengaged from game play. The neutral level may commonly occur for many players at various times during game play and, while not necessarily undesirable, the player's excitement and engagement are only moderate. As such, the neutral level is less desirable than the positive level. The negative level represents an emotion level in which the player is, for example, upset, angry, sad, bored, or fatigued. Players may experience this level, for example, when they have regularly lost over recent plays, when they do not enjoy the particular game or game features, when they are confused by the game, or when they have played too long without positive experiences in the game. The negative level is the least desirable emotion level for the player.

In some embodiments, the game controller may perform various actions during a game play session based on the player's present or recent emotion level (referred to herein as "game session actions"). For example, when the expression evaluation engine determines that the player is at a negative emotion level (e.g., presently, or consistently for a period of time), or when the player is unengaged with the game, the game controller may perform game session actions in an attempt to increase the player's emotion level. Game session actions may include, for example, adjusting colors of the game (e.g., to make the game more southing, or to change the appearance of the game to attract the player's attention), temporarily increasing a volume level of music or other sounds, increasing game music tempo, initiating a light show or entertaining video presentation, or offering free plays or other "comps" to the player.

In some embodiments, the game controller may capture game play data contemporaneously with emotion level data of the player during game play (collectively, "session data"). The game controller may transmit session data to a central server or store session data for later retrieval. Session data synchronizes game play data (e.g., what is occurring during a particular game) with emotion level data (e.g., what emotion level is being experienced by the player at that time), thereby allowing an analysis of player reaction to particular game play events or other environmental factors. Session data may be used (e.g., by game developers or casino operators) to evaluate player experience during game play sessions. For example, session data may allow game developers to evaluate which features of the game caused player excitement, joy, or anger, or what makes players get distracted or excited about the game. Session data may allow casino operators, or others, to evaluate player enjoyment of particular games in their casino or levels of distraction or other environmental conditions that may be present in particular areas of their casino. Such "real-world" session data provides benefits over typical test environment data inasmuch as the session data is generated under actual real-world conditions (e.g., at the casino property, with typical distractions) and by actual players (e.g., in a broad spectrum of states, playing with their own money).

As used herein, the terms "primary game" and "base game" may refer to games initiated in response to one of a plurality of game initiation events, such as a wager or credit being received by or transferred to an EGM, as described herein. A primary game may be associated with a primary game outcome represented by a plurality of primary game symbols or primary game reels, each of which may include a plurality of primary game symbols, and each of which may be selected based upon a random number generated by a random number generator.

Further, as used herein, the terms "secondary game" and "bonus game" may refer generally to a game or a component of a game involving procedures in addition to the primary game. In some embodiments, a bonus game may be triggered from a primary game and may be associated with a bonus game outcome, which may be different from the primary game outcome. For example, a bonus game may be initiated after, or during, a primary game and in response to the occurrence of a particular condition, such as a "trigger condition" occurring during the primary game. In some embodiments, a bonus game may be a scheduled or timed bonus (e.g., for an individual machine or a bank of machines). A bonus game may result in a bonus game outcome or bonus award that increases a primary game award or adds a bonus game award to a primary game award.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a game outcome may be generated on a central determination gaming system server 106 and then transmitted over the network to any of a group of remote terminals or remote gaming devices 104A-104X that utilize the game outcome and display the result to the player.

Gaming device 104A is often of a cabinet construction that may be aligned in rows or banks of similar devices for placement and operation on a casino floor. The gaming device 104A often includes a main door 116 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to determine an outcome to the game.

In many configurations, gaming machine 104A may have a main display 128 (e.g., video display monitor) mounted to, or above, gaming display area 118. Main display 128 may be, for example, a high-resolution LCD, plasma, LED, OLED, or microLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
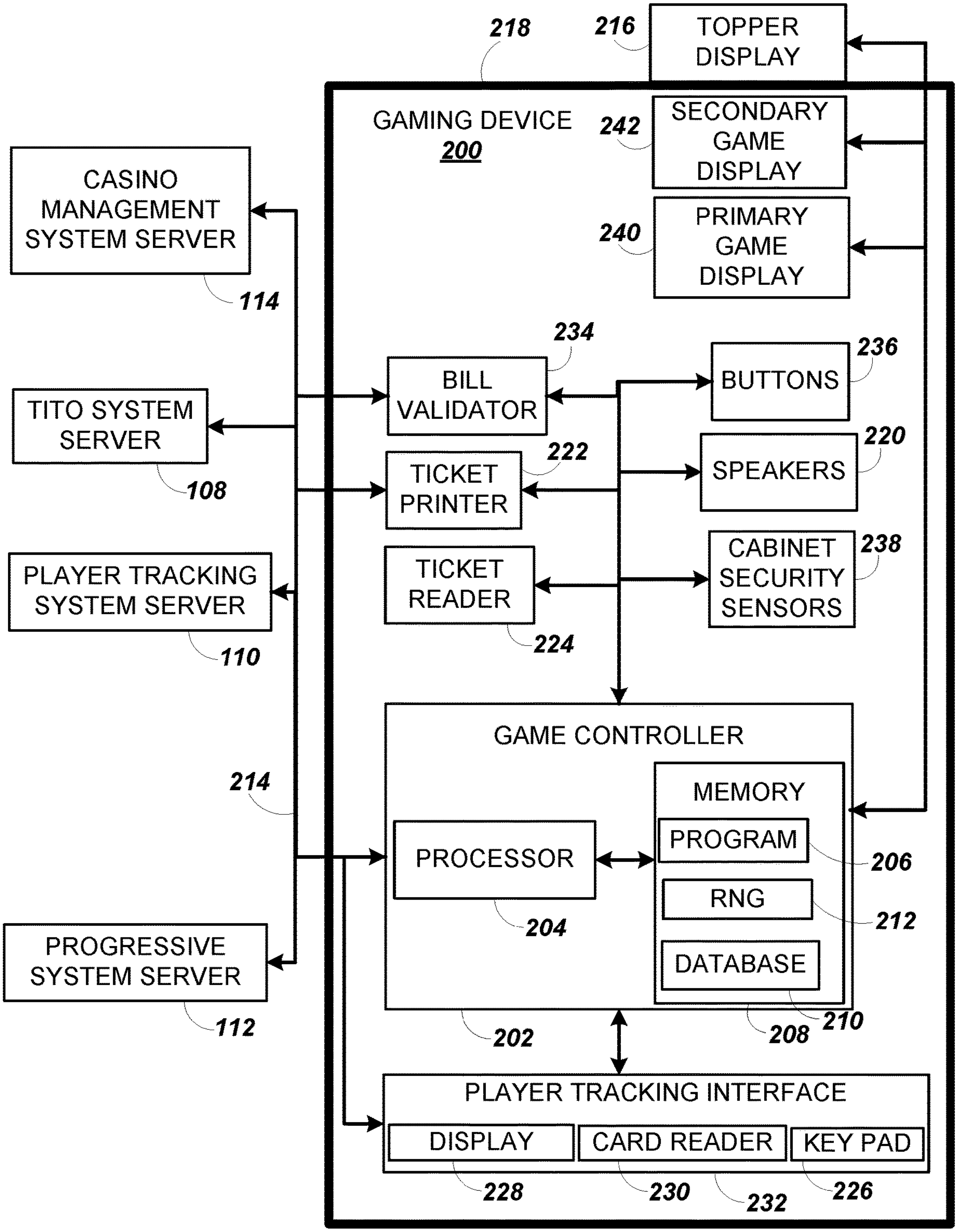
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 118 that opens to provide access to the interior of gaming device 104B. Main door 118, or service door, is typically used by service personnel to refill ticket-out printer 126 and collect bills and tickets inserted into bill validator 124. Main door 118 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A has a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in one or more databases 210 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a game instance, or round of play of the game, may be generated on a remote gaming device such as central determination gaming system server 106, shown in FIG. 1. The game instance is communicated to gaming device 200 via a network 214 and is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from central determination gaming system server 106 into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232. Player tracking interface 232 may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3:
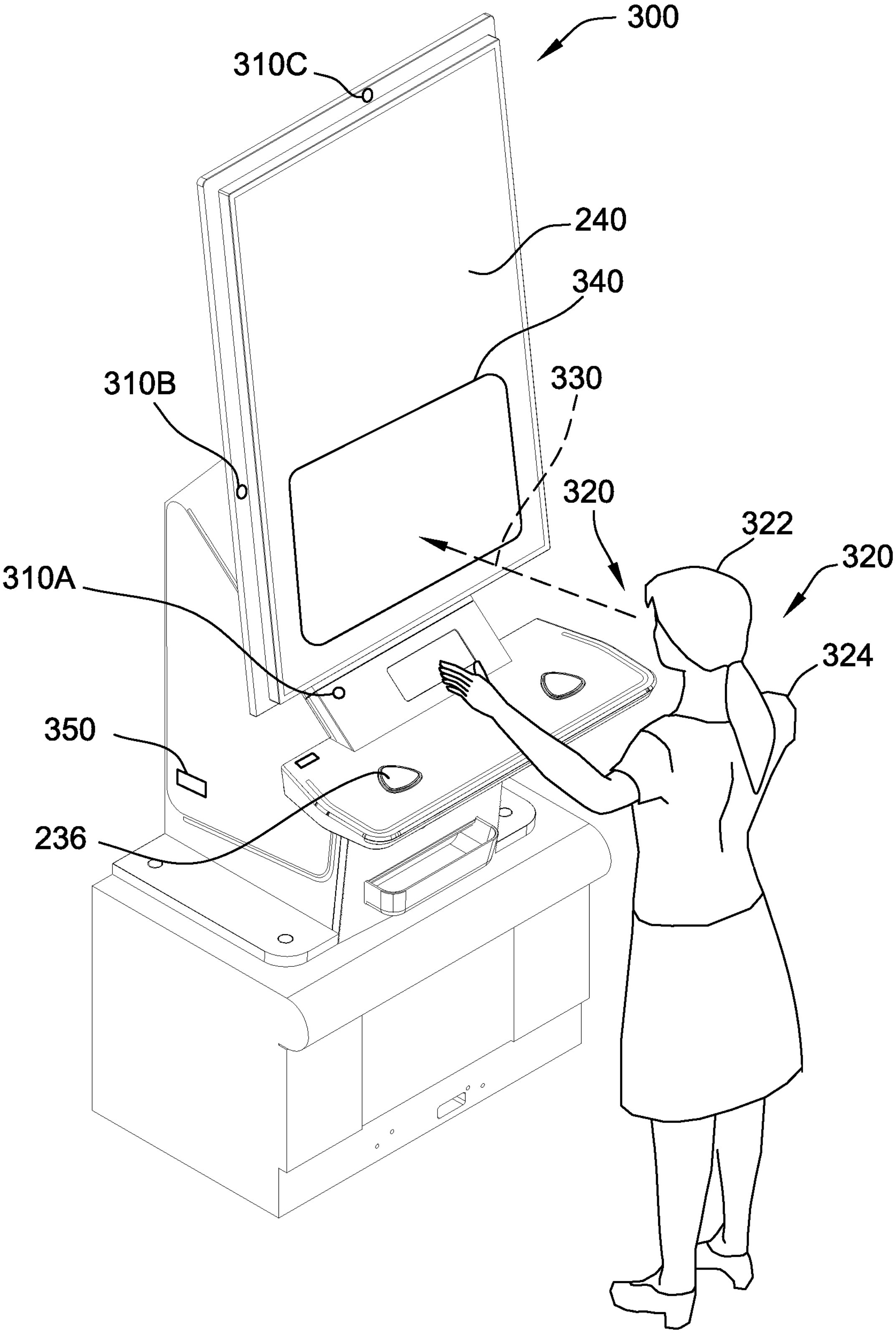
FIG. 3 is a diagram of an exemplary gaming device that may be used to capture player engagement and player emotion of a player and enhance player experience during game play.

FIG. 3 is a diagram of an exemplary gaming device 300 that may be used to capture player engagement and player emotion of a player 302 and enhance the player experience during game play. Gaming device 300 may be similar to gaming devices 104A-104X or gaming device 200 (e.g., may include any of the described components of such devices), and may be networked with other gaming devices or computing devices as described above with reference to FIGS. 1 and 2. In the example embodiment, gaming device 300 includes one or more digital camera devices (or just "cameras") 310A, 310B, 310C (collectively, "cameras 310") that capture digital images or video of the player 302 and a surrounding environment (not labelled) as the player 302 plays a wagering game. Further, in the example embodiment, gaming device 300 includes a game controller and an expression evaluation engine (both not depicted in FIG. 3) internal to gaming device 300, and may include one or more sensors 350. In other embodiments, the expression evaluation engine may and associated methods may be performed on a server system (e.g., central determination gaming system server 106, player tracking system server 110, or such).

In the example embodiment, camera(s) 310A is positioned below main display 240 and is oriented such as to capture digital images or video of a face 320 and head 322 of the players 302 when the players 302 are positioned during game play. Gaming device 300 may be a stand-up device (e.g., as depicted in FIG. 3) or may include a seat or bench (not shown) at which the players 302 may sit. As such, camera(s) 310A may be oriented to accommodate the particular configuration of gaming device 300 and common height ranges or positions of players 302 such as to facilitate capturing digital video of the face 320 and head 322 of the players 302. In some embodiments, gaming device 300 may additionally or alternatively include cameras 310 positioned at different locations, such as with camera devices 310B and 310C. Facial expression processing by the expression evaluation engine may be improved when performed with digital images or video of the face 320 of the player 302 from approximately in front of the player 302 and near a gaze direction 330 of the player 302. In this example, the wagering game is primarily presented in a primary display area 340 of the main display 240. For example, the display area 340 may be used to present a base game or aspects of bonus games, where other areas of the main display 240 may be used for supplemental features or other presentations. In other words, much of the player 302's focus is typically given to the primary display area 340. As such, cameras positioned near or around primary display area 340 may provide video that yields improved facial expression evaluation.

Various environmental conditions can impact the emotion level of the player 302. For example, the position of gaming device 300 within a casino may introduce distractions or other factors of dissatisfaction such as other nearby gaming devices 300 or gaming tables, high foot traffic, near smoking areas, high noise areas, hot or cold areas, or high occurrence of spectators. The player 302's reactions to such environmental conditions may manifest in facial expressions of the player. Such environmental conditions may be referred to herein as "environmental factors" inasmuch as the environmental conditions impact the emotion level of the player 302. Gaming device 300 may be configured to analyse environmental factors and detect such distraction and dissatisfaction in the player 302.

Gaming device 300 may utilize digital video from cameras 310 or sensor data from other sensors included within gaming device 300 to detect environmental conditions around the player 302. For example, digital images or video from camera 310C may be oriented such as to capture a wider view around gaming device 300 and may be analysed, for example, to capture motion of pedestrians near gaming device 300 and detect whether gaming device 300, for example, is positioned in a high-traffic area, or is near a tournament play environment. Similarly, digital video from cameras 310 may be analysed to detect spectators near gaming device 300 or cell phone use of the player 302. In some embodiments, gaming device 300 may use sensor data to detect player gestures. For example, gaming device 300 may use video from cameras 310 or from a motion detector camera (not shown in FIG. 3) to detect slumping in the player 302's shoulders, a startled reaction by the player 302, or smartphone use by the player 302. Such gestures may be used to evaluate emotion level of the player (e.g., level of distraction due to smartphone use, disappointment with slumped shoulders, and so forth).

In some embodiments, gaming device 300 may use digital video from cameras 310 to evaluate a gaze direction or point of gaze of the player 302 (e.g., where they player 302 is looking). For example, gaze direction may be evaluated based on a combination of an orientation of the head 322 of the player 302 relative to shoulders 324 of the player 302 (e.g., as the player 302 turns their head 322), an orientation of the shoulders 324 of the player 302 relative to the gaming device 300 (e.g., as they turn their head 322 to look over their shoulders 324), a normalized orientation of facial points, or eye tracking methods for measuring eye movement. Analysis of an approximate gaze direction may be computed and used to evaluate whether or when the player 302 is actively watching the game (e.g., looking at primary display area 340 or elsewhere on main display 240) or otherwise looking at gaming device 300 (e.g., looking at buttons 236). Such analysis may be calibrated, for example, at times where focus on the gaming device 300 is likely to be high (e.g., when the player 302 first sits down, when a significant win occurs). If the gaze direction is determined to be outside a configured area (e.g., relative to the dimensions of the gaming device 300 and of the player 302), then the level of engagement of the player 302 may be evaluated "low," where if the gaze direction is determined to be within the configured area, then the level of engagement may be evaluated as "high." In some embodiments, gaming device 300 may be configured to track an amount of time that the player 302 gazes at the gaming device (e.g., at primary display area 340) during a specific game event or bonus. For example, some players may have varying levels of interest in a particular bonus game being presented in the primary display area 340, and may manifest that level of disinterest by looking away from the gaming device 300 (e.g., looking at their smartphone, turning their head 322 toward another nearby machine, talking to another player, and so forth). Players having more interest in that same bonus game may gaze at the primary display area 340 more than others. As such, the collected gaze data may be synchronized with the game play data to evaluate whether the player 302 is focused on (e.g., gazing at) the bonus game as the bonus game is being presented. Such gaze data may be of interest in later analysis (e.g., by casino operators or game developers). In some embodiments, the gaming device 300 may use such gaze data to attempt to reacquire the focus of the player 302. For example, the gaming device 300 may play an additional sound or display an additional video feature when detecting that the player 302 is not gazing at the primary display area 340.

In some embodiments, gaming device 300 may include one or more additional sensors such as, for example, a microphone (e.g., for capturing audio data around gaming device 300), a thermometer (e.g., for capturing ambient temperature experienced by the player 302 near gaming device 300), a smoke detector (e.g., for detecting air quality near gaming device 300), a motion detector camera (e.g., for detecting motion of the player 302 or other spectators or other foot traffic), or a thermal camera (e.g., for capturing temperature data of the player 302, for detecting spectators or foot traffic near gaming device 300) (each not separately depicted). Audio from the microphone may be used to determine environmental conditions such as high ambient noise (e.g., capturing an ambient noise level, and calibrated to detect noise not originating from gaming device 300, which may be an aggravant to some people), the player 302 engaging in speech (e.g., distracted by conversation, phone), nearby noise events (e.g., a distinct game win event at a neighbouring gaming device 300, an alert from a cell phone of the player 302), or nearby speech (e.g., the speech of people other than the player 302). Gaming device 300 may include multiple microphones, some of which may be calibrated to focus on the sitting or standing location of the player 302, and audio analysis may use multiple audio streams to differentiate sounds originating at or near the player 302 to other sounds. In some embodiments, a direction of a noise event may be determined (e.g., using multiple audio streams from directional microphones). In some embodiments, game sound level may be increased or lowered based on an ambient noise level around the gaming device 300.

In some embodiments, the thermometer or thermal camera may be used to capture an ambient temperature near the player 302. Players that are too warm or too cold may become uncomfortable, which may lead to overall dissatisfaction during game play, thereby affecting emotion level. Casino operators, once aware, may wish to change heating, ventilation, and air conditioning (HVAC) properties near gaming device 300. In some embodiments, gaming device 300 may include an integrated air conditioner, heater, or fan, and gaming device 300 may automatically engage such devices based on the ambient temperature near gaming device 300 (e.g., for climate control). In some embodiments, the smoke detector may be used to detect the quality of air near gaming device 300, and may be used to automatically activate the fan or otherwise move fresh air into the area around gaming device 300.

In some embodiments, gaming device 300 may allow players 302 to capture and broadcast streaming media (e.g., live streaming in real time). During game play, the player 302 may elect to broadcast streaming media of themselves as they play the wagering game. Audio of the player 302 and ambient environmental sounds (e.g., game play audio) is captured by the microphone(s) and video of the player 302 is captured by the camera(s) 310. In some embodiments, audio and video of game play (e.g., what is shown on displays 240, 242) may also be captured. Such audio and video data of the player 302 may be referred to herein as "personal streaming data." In some embodiments, gaming device 300 may allow players 302 to share their own personal streaming data with other players (e.g., at other gaming devices 300 within a casino premises), for example, allowing friends or relatives to watch each other's personal streaming data (e.g., game play, audio, video). This allows players to share their gaming experiences during a gaming session when not near each other (e.g., communicating, viewing game play, sharing emotional moments, and so forth). Gaming device 300 may present any or all of the game play audio and video or personal audio and video of one player 302 to another player 302. Such streaming video may be viewed on one of the displays 240, 242, for example, in a dedicated location within the main display 240 or secondary display 242, as a picture-in-picture, or as a movable window. Streaming audio of the other player may be output on gaming device 300 through speakers 220. In some embodiments, gaming device 300 may allow players 302 to share their personal streaming data via social media or live streaming sites (e.g., Facebook® Live, Periscope®, Twitch®, and such). (FACEBOOK is a registered trademark of Facebook, Inc., a Delaware Corporation; PERISCOPE is a registered trademark of Twitter, Inc., a Delaware Corporation; TWITCH is a registered trademark of Twitch Interactive, Inc., a Delaware Corporation). For example, the personal streaming data of the player 302 may be transmitted via network 214 out to the Internet. As such, players 302 may have enhanced excitement brought by remotely sharing their experience with others as they experience game play. Further, game developers and casino operators may also experience benefits from live streaming. For example, game popularity of a wagering game may be increased through the additional exposure of game play to others via the streaming, thus boosting overall interest in the wagering game. Such increased exposure and interest may cause more players to visit casinos offering that wagering game, or may cause streaming players to play for longer (e.g., to continue their streams when the streaming player has numerous viewers).

Figure 4:
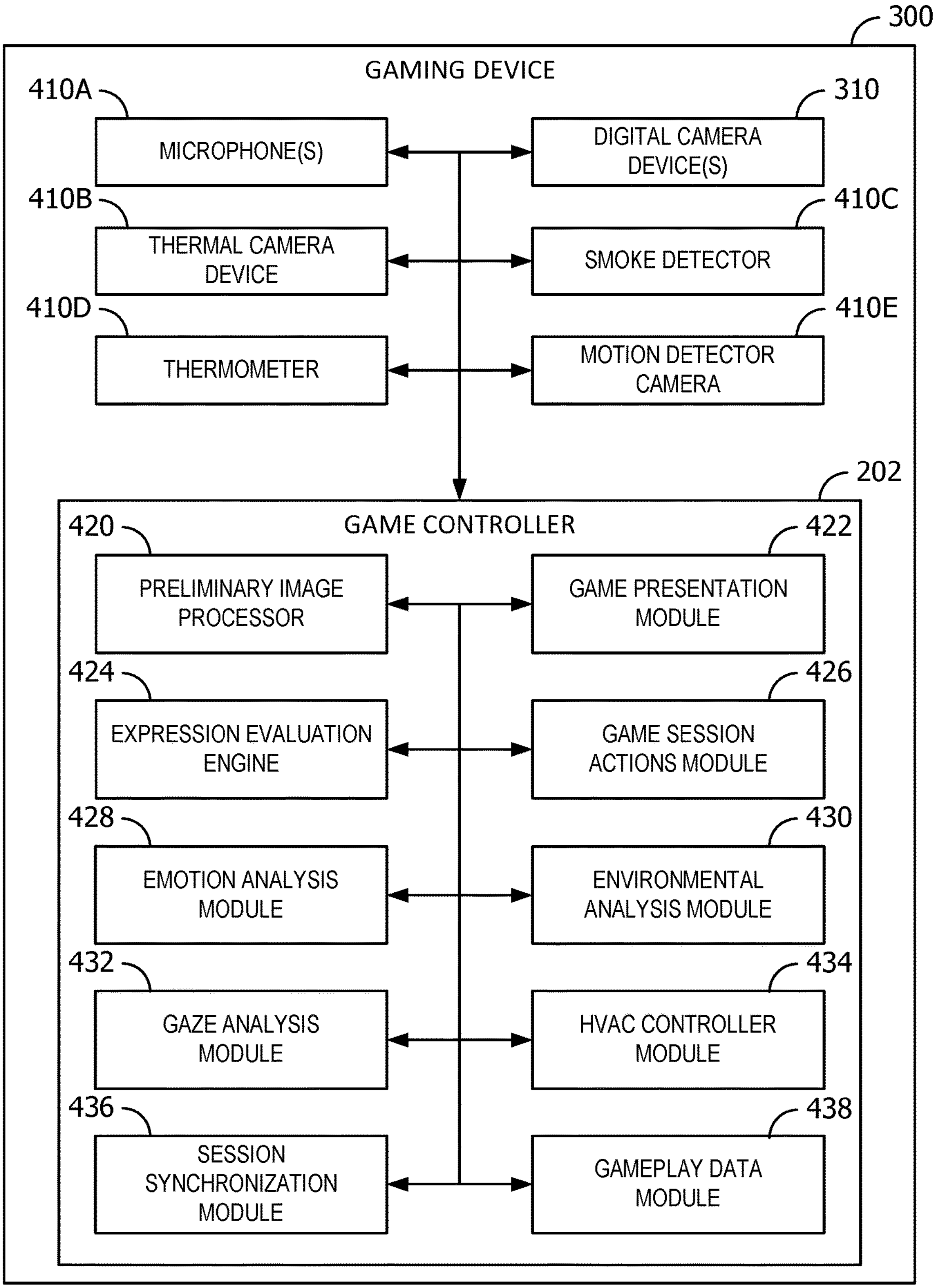
FIG. 4 is a component diagram illustrating an example embodiment of gaming device.

FIG. 4 is a component diagram 400 illustrating an example embodiment of gaming device 300. It should be understood that, while FIG. 4 illustrates additional components of gaming device 300 not shown in FIG. 3, not all components of gaming device 300 or game controller 202 are shown for ease of illustration. In the example embodiment, game controller 202 of gaming device 300 includes a preliminary image processor, a game presentation module 422, an expression evaluation engine 424, a game session actions module 426, an emotion analysis module 428, an environmental analysis module 430, a gaze analysis module 432, an HVAC controller module 434, a session synchronization module 436, and a gameplay data module 438. Further, gaming device 300 includes one or more digital cameras 310, one or more microphones 410A, a thermal camera 410B, a smoke detector 410C, a thermometer 410D, and a motion detector camera 410E (collectively referred to herein as "sensors 410"). Sensors 410 may be similar to sensors 350. Output from each of the sensors 410 may be used by various modules of game controller 202 to evaluate the emotion and engagement level of the player 302.

In the example embodiment, game presentation module 422 provides the wagering game to the player 302 during game play. For example, game presentation module 422 may display simulated reels of a slot-style game or cause mechanical reels to spin upon a wager being placed by the player 302 (e.g., a base game, a bonus game) using the RNG 212 (e.g., similar to the game program 206), generating game outcomes, and so forth. In some situations, such as under U.S. gaming regulations, gaming device 300 may be prohibited from altering an outcome of the wagering game. As such, the various modules of game controller 202 may use game presentation module 422 to manipulate aspects of appearance of the wagering game, but does not impact game outcomes (e.g., does not cause the player 302 to win more often). In other situations, such as in social gaming contexts (e.g., where no money wager is taken), such gaming devices may not be prohibited by law to manipulate game outcomes. In such contexts, game presentation module 422 may manipulate game outcomes based on an emotion level or engagement level of the player 302 (e.g., generating higher win percentages, larger wins, activating bonus games, and so forth).

Figure 5:
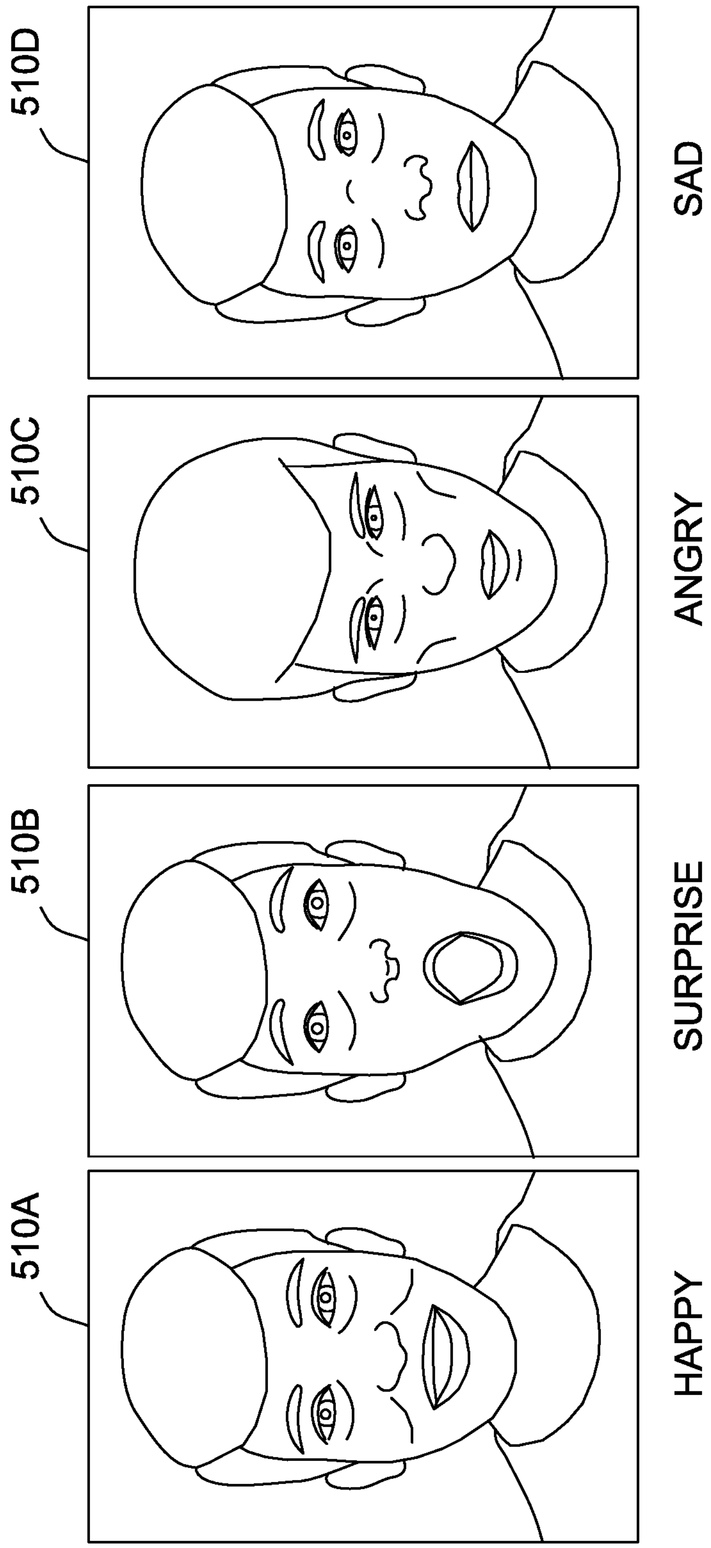
FIG. 5 illustrates example images of a person (e.g., the player) in various emotional states as exhibited by facial expression.

The expression evaluation engine 424 performs facial expression analysis on digital video of the player 302 (e.g., during game play) to determine an emotional state of the player 302. In some embodiments, expression evaluation engine 424 is a third-party product configured to evaluate facial expressions, such as those made available by iMotions, Inc. (a Delaware corporation), Affectiva (a Delaware corporation), and Noldus (a Netherlands company). Such expression evaluation engines 424 perform aspects of image analysis of the facial features using, for example, eyes and eye corners, orientation of eyebrows, mouth corners, nose tip, or facial muscles. FIG. 5 illustrates example images 510A-D (collectively, "images 510") of a person (e.g., the player 302) in various emotional states as exhibited by facial expression. The person is expressing happiness or joy in image 510A, surprise in image 510B, anger in image 510C, and sadness in image 510D. Each of the images 510 represent digital images (or frames of digital video) of the player 302 captured by one or more of the cameras 310 during game play. It should be understood that the images 510 and resulting determined emotional states shown in FIG. 4 are merely exemplary, and that other emotional states may be determined.

Returning again to FIG. 4, in the example embodiment, expression evaluation engine 424 generates an emotional state output based on the input image 510. Emotional state output may include such emotional states as, for example, tense, nervous, stressed, upset, alert, excited, elated, happy, sad, depressed, bored, fatigued, content, serene, relaxed, or calm. In some embodiments, preliminary image processor 420 may perform image processing operations prior to sending images 510 to expression evaluation engine 424. For example, preliminary image processor 420 may capture a broader image (not shown) of the player 302 (e.g., including upper and lower body of the player 302 and background of the environment behind the player 302. Preliminary image processor 420 may perform face detection of the broader image to identify the position of the face 320 of the player 302 (e.g., via Viola Jones Cascaded Classifier), and may crop the broader image to generate images 410.

The emotion analysis module 428 categorizes the emotional state determined by the expression evaluation engine 424 to determine an emotion level. In the example embodiment, the emotion analysis module 428 categorizes the player 302 into one of three emotion levels: positive, neutral, and negative. The positive emotion level represents the most desirable emotion level of the player, where the player's excitement level and engagement with the game are high. Players may experience this level, for example, when there are exciting features of the game occurring, when the player has recently won a large payout, or when they relate to or are excited by the game design. The neutral level represents an emotion level in which the player is content, calm, or relaxed. Players may experience this level, for example, when they have recently experienced only modest wins, when there are no particularly interesting features of the game being activated, or when they are moderately disengaged from game play. The neutral level may commonly occur for many players at various times during game play and, while not necessarily undesirable, the player's excitement and engagement are only moderate. As such, the neutral level is less desirable than the positive level. The negative level represents an emotion level in which the player is, for example, upset, angry, sad, bored, or fatigued. Players may experience this level, for example, when they have regularly lost over recent plays, when they do not enjoy the particular game or game features, when they are confused by the game, or when they have played too long without positive experiences in the game. The negative level is the least desirable emotion level for the player.

In the example embodiment, the emotion analysis module 428 assigns an emotion level of positive when the determined emotional state of the player 302 is happy, excited, satisfied, engaged, joyful, surprised, elated, or positive. An emotion level of neutral is assigned when the determined emotional state of the player 302 is content, neutral, or limited attention. An emotion level of negative is assigned when the determined emotional state of the player 302 is angry, fearful, sad, disgusted, negative, or distracted.

In some embodiments, the emotion analysis module 428 may, additionally or alternatively, determine an engagement level of the player 302 based on the determined emotional state of the player 302. In one embodiment, an engagement level of high is assigned when the determined emotional state of the player 302 is tense, nervous, stressed, upset, alert, excited, elated, or happy. An engagement level of low is assigned when the determined emotional state of the player 302 is sad, depressed, bored, fatigued, content, serene, relaxed, or calm.

Further, in the example embodiment, the emotion analysis module 428 initiates a process of collecting images 510 and driving expression evaluation engine 424 to determine emotional states. In the example embodiment, the emotion analysis module 428 initiates image collection and processing on a periodic basis, such as at a pre-determined frequency (e.g., four times a second, once a second). More specifically, and for example, the emotion analysis module 428 prompts the camera 310A to capture an image 510 of the player 302, which is transferred to expression evaluation engine 424 (optionally through preliminary image processor), thereby receiving the emotional state of the player 302 and generating the emotion level therefrom. In some embodiments, the emotion analysis module 428 initiates image collection and processing based on particular trigger events. For example, the emotion analysis module 428 may initiate image capture and processing upon the player 302 interacting with the gaming device 300 (e.g., when the player 302 cards into the gaming device 300, when the player 302 presses the button 236 to spin the reels in a base game, when the player 302 presses a call button to summon a cocktail hostess), based upon game-based trigger events (e.g., a particular symbol appearing during the wagering game, a particular feature being triggered during the wagering game, upon generating an outcome of the wagering game), or based on environmental conditions (e.g., when loud noises are detected nearby, when an excessive amount of foot traffic is detected nearby, when a nearby gaming device has produced a significant win event).

In the example embodiment, the game session actions module 426 is configured to perform various game session actions based on the determined emotional state, emotion level, or engagement level (e.g., in an effort to move the player 302 from less desirable emotion levels to more desirable emotion levels). Game session actions may include, for example, adjusting game colors or other aspects of presentation of the wagering game (e.g., as presented by game presentation module 422), initiating play of or altering a volume level of game audio or music, offering complimentary items or services ("comps," e.g., free plays, meals at casino restaurants, free beverages, hotel room, shopping experience at casino shops), initiating beverage services at the gaming device 300, or increasing player tracking account credit balance or status level. In some embodiments, game session actions may include offering special rewards for player birthday, anniversary, or individual or group celebration for a special occasion. In situations in which engagement level of the player 302 is determined to be low, the game session actions module 426 may identify one or more other games of potential interest to the player 302 (e.g., based on comparing the current wagering game or gaming machine 300 to past playing experience, game type, manufacturer, and so forth). As such, the game session action may include providing the game recommendations, determining whether and which recommended gaming devices are presently unoccupied at the current casino property, and providing a casino map identifying location of the recommended gaming devices. Game session actions may include alerting the casino operator of the player 302's low engagement level or poor emotional level (e.g., automatically transmitting an alert to a host), which can cause the host to visit and interact with the player 302 to improve their mood, offer comps, or otherwise improve the player's experience. In non-wagering (e.g., social) gaming, game session actions may include altering outcomes of the social game.

In some embodiments, game session actions module 426 may initiate a game sessions action (e.g., comp'ing the player 302 with $5 credit for free plays) upon determining that the player 302's emotion level being negative, or being not positive, for a pre-determined period of time (e.g., for five minutes) or for a pre-determined number of plays (e.g., through 20 plays). In some embodiments, the game session action may also be conditioned based on aggregate wagering outcomes of the player 302 (e.g., experiencing net outcomes below a pre-determined threshold over the same period of time or over the same number of plays). For example, if the player 302 exhibits negative or neutral emotion level over 20 plays while experiencing a net positive wagering outcome over those 20 plays, then the game session actions module 426 may not perform a game session action. In contrast, if the player 302 exhibits both a negative or neutral emotion level as well as a net wagering outcome below a pre-determined threshold (e.g., more than $100 loss) over those 20 plays, then game session actions module 426 may initiate the game session action. In some embodiments, the casino operator may configure the pre-determined threshold level (of net wagering outcomes) for each particular game session action (e.g., on an action-by-action basis), and may configure different threshold levels for different players 302 (e.g., on a player-by-player basis). In some embodiments, game session actions module 426 may initiate harm minimization or self-exclusion for problem gamblers (e.g., based on net wagering outcomes and emotion level).

In some embodiments, the emotional state or emotion level may be aggregated over a window of time (e.g., to develop an average emotional state or an average emotion level over that time period). Some emotional states may be fleeting, brief, or temporary. For example, the player 302 may become distracted based on the conduct of a nearby player or angry based on an incident in one game that quickly provides a happy emotional state (e.g., an unanticipated winning outcome). As such, the game controller 202 may utilize an average emotional state or average emotional level when initiating game session actions so as to avoid reacting to what is only a temporary state from which the player 302 may naturally recover. In some embodiments, game session actions may be initiated only when a non-positive or a negative emotion level is detected a pre-determined number of times within a window of time. In some embodiments, a subsequent game session action may be initiated only after a pre-determined amount of time since the previous game session action was initiated (e.g., using a timeout or countdown timer).

In some embodiments, environmental analysis module 430 collects environmental data about environmental conditions (e.g., near gaming device 300) that may impact player experience or emotion level of the player 302 during game play. Environmental analysis module 430 may initiate sensor data collection from sensors 410, such as capturing audio via microphones 410A, capturing thermal images or thermal video via thermal camera 410B, capturing air quality data via smoke detector 410C, capturing temperature data via thermometer 410D, or capturing motion data via motion detector camera 410E. In some embodiments, environmental data may be used (e.g., as a factor) to evaluate engagement level or emotion level or to initiate game session actions. In some embodiments, environmental data may be collected (e.g., as a component of game play session data) and used in offline analytics (e.g., to correlate changes in emotional state or emotion level with possible environmental conditions occurring near the player 302 or gaming device 300 during game play). Collection of environmental data may be initiated as described above with regard to emotional states, or may be initiated based on a change in emotion level (e.g., when the player 302 changes from positive to neutral or negative).

In some embodiments, gaze analysis module 432 determines the gaze direction 330 of the player 302 during game play. The gaze direction 330 may be used (e.g., exclusively, or as a factor along with emotional state) to determine the engagement level of the player 302. For example, if the gaze direction 330 of the player 302 is determined to be away from the primary display area 340 or elsewhere on main display 240 for a pre-determined period of time (e.g., 5 seconds), then gaze analysis module 432 may determine that the engagement level of the player is low. Conversely, if the gaze direction 330 is determined to be within the primary display area 340 or elsewhere on main display 240 for a pre-determined period of time (e.g., 5 seconds), then the engagement level of the player may be set to high. Gaze analysis module 432 may acquire digital images or video from cameras 310 or motion detector camera 410E for use in determining the gaze direction 330 (e.g., via shoulder orientation, head orientation, eye orientation, and so forth). Further, gaze analysis module 432 may include gaze direction data as a part of game session data. In some embodiments, gaze analysis module 432 may perform gaze analysis on people other than the player 302. For example, when the gaming machine 300 is not currently in use, gaze analysis module 432 may detect when a passer-by gazes at the gaming machine 300 and may initiate an "attract mode" (e.g., additional lights and sounds, demo presentations, and so forth) that is configured to automatically entice the passer-by to play the gaming machine 300.

In some embodiments, the HVAC controller module 434 initiates game session actions to alter environmental conditions around gaming device 300, and may be based on environmental conditions (e.g., as captured by thermometer 410D, thermal camera device 410B, or smoke detector 410C, or as generated by environmental analysis module 430). Such game session actions may include, for example, engaging a fan, heater, or air conditioner (none of which are shown) of gaming device 300. In some embodiments, HVAC controller module 434 may collect environmental conditions data as a part of game session data.

In the example embodiment, gameplay data module 438 collects data regarding game play. Gameplay data may include, for example, game-specific data for each play of the wagering game (e.g., amount wagered, net wagering outcome, base spin results, features initiated, bonus game results, jackpots won), session data (e.g., player profile information, credits established, comps given, time in and time out of gaming device 300, play rate (e.g., rate or speed of game play), aggregate outcome, drink service requests), and proximity gameplay data (e.g., activity level of nearby EGMs, jackpots or other large wins occurring during the gaming session).

Session synchronization module 436, in the example embodiment, captures and synchronizes the data generated by the various modules of game controller 202 in a time-synchronized log. For example, session synchronization module 436 collects and synchronizes emotional state data generated by expression evaluation engine 424, emotion level data generated by emotion analysis module 428, game session actions initiated by game session actions module 426 or HVAC controller module 434, environmental data captured by environmental analysis module 430 or HVAC controller module 434, gaze direction data generated by gaze analysis module 432, and gameplay data captured by gameplay data module 438. Such data may be referred to collectively herein as "session data." In the example embodiment, components of session data may be timestamped by session synchronization module 436 (e.g., when received), or timestamped using a shared clock (not shown) at a time of occurrence or capture by the associated module (e.g., when generated). As such, each of the disparate types of session data may be examined together, with the timestamps acting as chronological synchronization to depict what was happening or what data was being generated at any given time during a game play session.

In some embodiments, session synchronization module 436 may store session data for later retrieval (e.g., download by a technician). In some embodiments, session synchronization module 436 may transmit any or all of the session data to a network-connected server (e.g., casino management system server 114, player tracking system server 110, an EGM manufacturer server (not shown), or such). Session synchronization module 436 may remove or otherwise sanitize personally identifiable information (PII) from the session data prior to removal (e.g., to protect privacy). In the example embodiment, no raw video or images of the player 302 are stored with session data, other than for transient use as described above (e.g., in generating emotional state). In some embodiments, the gaming device 300 may allow the player to opt into or out of any of the sensor collection or analysis data described herein.

In some embodiments, session data may be used by game developers or manufacturers of gaming device 300. For example, game developers may analyse aspects of game design and impacts on players' emotional states or emotion levels (e.g., how different players react to game aesthetics, game features, or other aspects of game play, what causes players to lose focus or interest). Such data may help game developers design better games or improve existing games. Developers may examine situations in which a particular player exhibits a low emotion level for one particular game but then exhibits a higher emotion level for another game and may then attempt to determine whether the differing emotion level was due to gaming outcomes or whether the difference was based on some aspect of game design (e.g., based on music, theme, colors). In some embodiments, developer feedback may be shared with third parties, casinos, or manufacturers.

In some embodiments, session data may be used by the casino operator of gaming device 300. For example, casino operators may analyse emotional states or emotion levels of the same type of gaming device 300 at two different locations within a property, or different types of gaming devices 300 at a common location. Such data may help operators detect sources of distraction or discomfort for players and take remedial actions to improve emotion levels for future players. Casino operators may store session data as a part of player profiles, an overall emotion level of the player 302 during a given session or period of time, and may provide other comps to players if they exhibit poor emotion levels. The gaming device 300 may allow the casino operator to change the game presented to the player 302. For example, if the player 302 has become disinterested in (e.g., low engagement, non-positive emotional level) the current wagering game, the gaming device 300 may provide a menu of games from which the player 302 may choose).

In some embodiments, gaming device 300 may include haptic sensors (not shown) that allow gaming device 300 to detect certain types of actions taken by the player 302. For example, game controller 202 may be configured to use haptic sensors to detect when the player 302 stands up from, sits down in, or fidgets while seated in a chair during the gaming session. Game controller 303 may be configured to use haptic sensors (e.g., a piezoelectric sensor) to detect when the player 302 slams the gaming device 300. Such player actions may be used to evaluate the emotion level of the player 302. For example, a player slamming their hands on the button deck 120 or displays 240, 242 may indicate a frustrated emotion level, and the player fidgeting in their seat may be indicative of a level of distraction or discomfort.

Figure 6:
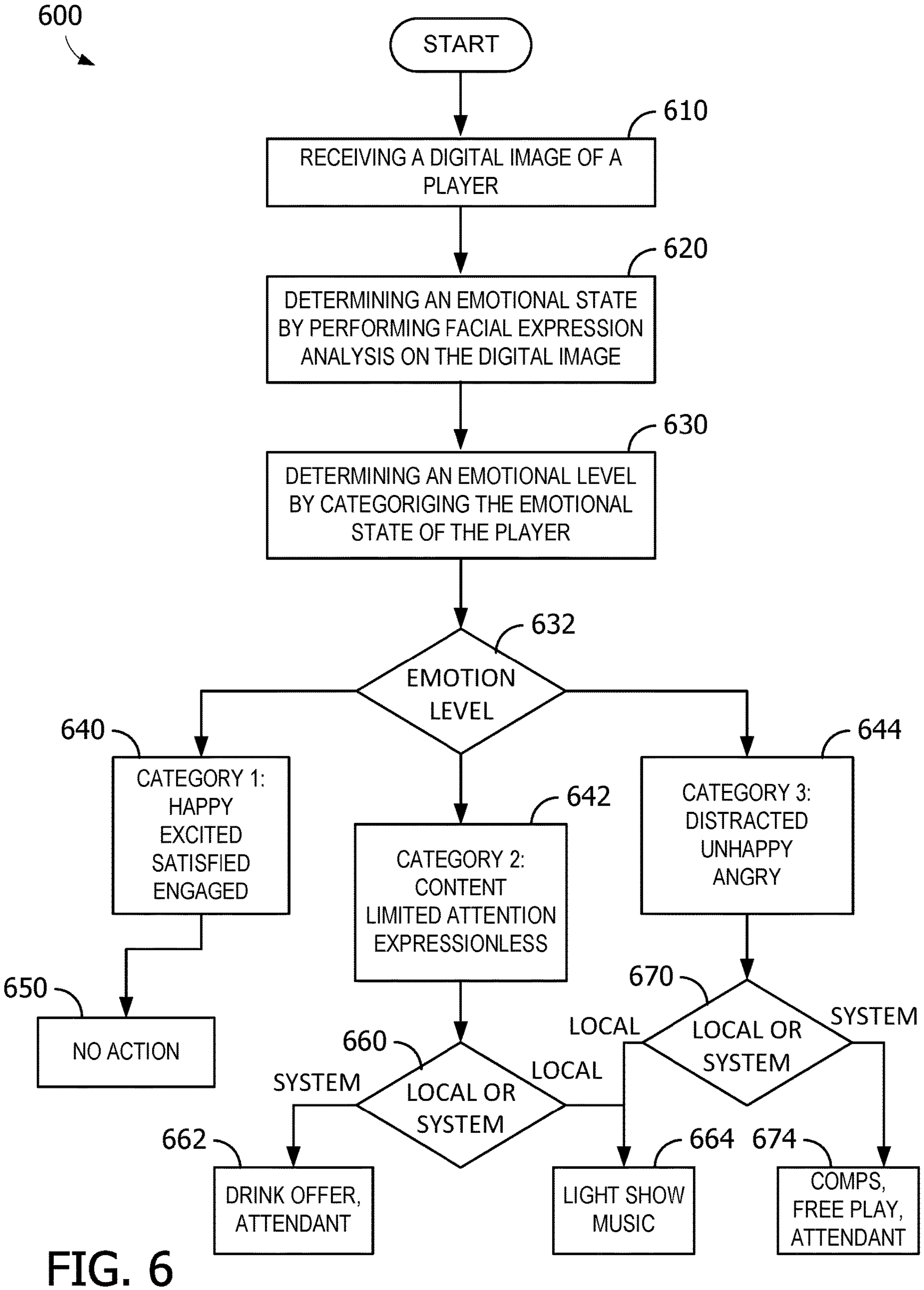
FIG. 6 is a flowchart illustrating a process for analyzing facial expressions of the player.

FIG. 6 is a flowchart illustrating a process 600 for analyzing facial expressions of the player 302, as described above. In the exemplary embodiment, process 600 is performed by game controller 300 (shown in FIG. 3).

In the exemplary embodiment, game controller 300 receives 610 a digital image of the player 302 (e.g., from the camera device 510A). Game controller 300 also determines 620 an emotional state of the player by performing facial expression analysis on the digital image. Game controller 300 also determines 630 an emotion level 632 of the player by categorizing the emotional state of the player based on the determined emotional state, the categorizing includes a first state representing a positive emotional level (e.g., "Category 1" 640, "positive") and a second state representing another emotional level (e.g., "Category 2" 642, "neutral", or "Category 3" 644, "negative"). Game controller 300 further determines that the emotional level is the other emotional level (e.g., "Category 2" 642 or "Category 3" 644). Game controller 300 automatically initiate a game session action during the game play session, the game session action is configured to cause the player to transition to the positive emotional level. If emotion level 632 is "positive", or within "Category 1" 640, then no game session action is taken 650. If emotion level 632 is "neutral," or within "Category 2" 642, then game controller 300 may test 660 whether to implement a local or system game session action, such as initiating 662 a drink offer or summoning an attendant, or initiating 664 a light show or music. If emotion level 632 is "negative," or within "Category 3" 644, then game controller may test 660 whether to implement a local or system game session action, such as providing 674 comps, free plays, or summoning an attendant.

In some embodiments, the method 600 includes determining an area within the digital image representing a face of the player, and cropping the digital image to include only the determined area prior to performing the facial expression analysis. In some embodiments, the game session action includes one of initiating a light show, adjusting colors of the wagering game, and altering audio presented during the wagering game. In some embodiments, the game session action includes one of calling an attendant, providing complimentary services, and providing complimentary credits for the wagering game.

In some embodiments, the method 600 further includes capturing gameplay data associated with the wagering game, timestamping the gameplay data and the emotion level to generate a time-synchronized log of the game play session, and storing the time-synchronized log for analysis by one or more of a game developer of the wagering game and a casino operator providing the electronic gaming machine. In some embodiments, the method 600 includes generating an engagement level of the player based at least in part on the determined emotional state. In some embodiments, the method 600 includes determining a gaze direction of the player based on the digital image, and determining that the gaze direction of the player is not directed at the electronic gaming machine, and generating an engagement level of the player is further based at least in part on the determining that the gaze direction of the player is not directed at the electronic gaming machine.

In some embodiments, the method 600 also includes detecting, using audio data captured by a microphone of the electronic gaming machine, a source of noise not related to the electronic gaming machine, and storing the audio data in the time-synchronized log. In some embodiments, the method 600 also includes receiving, from the camera device, digital video of an environment behind the player, performing motion analysis on the digital video to determine the presence of people walking near the electronic gaming machine, and automatically identifying foot traffic as a source of distraction for the player based on the motion analysis. In some embodiments, the second state represents a neutral emotional level, wherein the categorizing includes a third state representing a negative emotional level.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device, comprising:

at least one processor configured to execute instructions stored in a tangible, non-transitory, computer-readable storage medium, which when executed, cause the at least one processor to:

prompt for capturing of a first digital image of a player using a digital camera of a mobile computing device of the player during a game play session, the player playing a game on the electronic gaming device;

receive, from the mobile computing device of the player, the first digital image of the player;

analyze the first digital image using facial expression techniques to determine a first emotional state of the player;

prompt for capturing of a second digital image of the player using the digital camera of the mobile computing device of the player during the game play session;

receive, from the mobile computing device of the player, the second digital image of the player;

analyze the second digital image using the facial expression techniques to determine a second emotional state of the player; and in response to a current one of the first emotional state or the second emotional state of the player being associated with an undesired emotional level, automatically initiate a game session action at the electronic gaming device to cause the current one of the first emotional state or the second emotional state of the player to transition to a desired emotional level.

2. The electronic gaming device of claim 1, wherein the instructions further cause the at least one processor to categorize the first emotional state as having the desired emotional level.

3. The electronic gaming device of claim 2, wherein the instructions further cause the at least one processor to:

categorize the second emotional state of the player; and in response to the second emotional state of the player being categorized as an emotional level different from the desired emotional level, configure the game session action at the electronic gaming device to cause the current second emotional state of the player to transition to the desired emotional level.

4. The electronic gaming device of claim 2, wherein the instructions further cause the at least processor to periodically access the digital camera of the mobile computing device, and initiate capturing of one or more digital images of the player while the player is interacting with the electronic gaming device, the one or more digital images including the first digital image and the second digital image of the player.

5. The electronic gaming device of claim 1, wherein the instructions further cause the at least one processor to:

determine an area in the first digital image of the player representing a face of the player; and crop the first digital image of the player to include only the determined area.

6. The electronic gaming device of claim 1, wherein game session action includes at least one of: initiating a light show, adjusting colors of a wagering game, altering audio represented during the wagering game, calling an attendant, providing complimentary services, or providing complimentary credits for the wagering game.

7. The electronic gaming device of claim 1, wherein the instructions further cause the at least one processor to:

capture gameplay data associated with a wagering game contemporaneous with capturing of one or more digital images of the player using the digital camera of the mobile computing device of the player;

timestamp the gameplay data and one or more emotional levels identified corresponding to the captured one or more digital images; and generate and store a time synchronized log of the game play session based on the timestamped gameplay data and the one or more emotional levels for analysis of the player's reaction to a game play event.

8. The electronic gaming device of claim 1, wherein the instructions further cause the at least one processor to:

prompt for capturing of audio using a microphone of the mobile computing device of the player;

receive, from the mobile computing device of the player, the captured audio; and timestamp the received audio for including in the time synchronized log.

9. The electronic gaming device of claim 1, wherein the instructions further cause the at least one processor to:

determine a gaze direction of the player based on one or more digital images of the player captured using the digital camera;

determine that the gaze direction of the player is not directed to the electronic gaming device; and determine an engagement level of the player based, at least in part, on the determination that the gaze direction of the player is not directed to the electronic gaming device.

10. The electronic gaming device of claim 1, wherein the the first emotional state has the desired or positive emotional level, and the second emotional state has a neutral emotional level or a negative emotional level.

11. A mobile gaming device, comprising:

a digital camera; and at least one processor configured to execute instructions stored in a tangible, non-transitory, computer-readable storage medium, which when executed, cause the at least one processor to:

during a game play session, cause a first digital image of a player playing an electronic game on the mobile gaming device to be captured using the digital camera;

analyze the first digital image using facial expression techniques to determine a first emotional state of the player;

during the game play session, cause a second digital image of the player playing the electronic game on the mobile gaming device to be captured using the digital camera;

analyze the second digital image using the facial expression techniques to determine a second emotional state of the player; and in response to a current one of the first emotional state or the second emotional state of the player being associated with an undesired emotional level, automatically initiate a game session action at the mobile gaming device to cause the current one of the first emotional state or the second emotional state of the player to transition to a desired emotional level.

12. The mobile gaming device of claim 11, wherein the instructions further cause the at least one processor to categorize the first emotional state of the player as having the desired emotional level.

13. The mobile gaming device of claim 12, wherein the instructions further cause the at least one processor to:

categorize the second emotional state of the player; and in response to the second emotional state of the player being categorized as an emotional level different from the desired emotional level, configure the game session action at the electronic gaming device to cause the second emotional state of the player to transition to the desired emotional level.

14. The mobile gaming device of claim 11, wherein the instructions further cause the at least one processor to:

determine an area in the first digital image of the player representing a face of the player; and crop the first digital image of the player to include only the determined area.

15. The mobile gaming device of claim 11, wherein game session action includes at least one of: initiating a light show, adjusting colors of a wagering game, altering audio represented during the wagering game, calling an attendant, providing complimentary services, or providing complimentary credits for the wagering game.

16. The mobile gaming device of claim 11, wherein the instructions further cause the at least one processor to:

capture gameplay data associated with a wagering game contemporaneous with capturing of one or more digital images of the player using the digital camera;

timestamp the gameplay data and one or more emotional levels identified corresponding to the captured one or more digital images; and generate and store a time synchronized log of the game play session based on the timestamped gameplay data and the one or more emotional levels for analysis of the player's reaction to a game play event.

17. The mobile gaming device of claim 11, further comprising a microphone, and wherein the instructions further cause the at least one processor to:

prompt for capturing of audio using the microphone; and timestamp the captured audio for including in the time synchronized log.

18. The mobile gaming device of claim 11, wherein the instructions further cause the at least one processor to:

determine a gaze direction of the player based on one or more digital images of the player captured using the digital camera;

determine that the gaze direction of the player is not directed to the mobile gaming device; and determine an engagement level of the player based, at least in part, on the determination that the gaze direction of the player is not directed to the mobile gaming device.

19. The mobile gaming device of claim 11, wherein the first emotional state has the desired or positive emotional level, and the second emotional state has a neutral emotional level or a negative emotional level.

20. A computer-implemented method, comprising:

during a game play session, prompting for capturing of a first digital image of a player using a digital camera of an electronic device;

analyzing, by at least one processor of the electronic device, the first digital image using facial expression techniques to determine a first emotional state of the player;

during the game play session, prompting for capturing of a second digital image of the player using the digital camera of the electronic device;

analyzing the second digital image using the facial expression techniques to determine a second emotional state of the player; and in response to a current one of the first emotional state or the second emotional state of the player being associated with an undesired emotional level, automatically initiating a game session action at the electronic device to cause the current one of the first emotional state or the second emotional state of the player to transition to a desired emotional level.

* * * * *